US006520386B2

United States Patent
Harbaugh et al.

(10) Patent No.: US 6,520,386 B2
(45) Date of Patent: Feb. 18, 2003

(54) OVERFILL SAFETY SPOUT FOR FLUID CONTAINER

(76) Inventors: David G. Harbaugh, 26 Sunset Trail, Portage, Porter County, IN (US) 46368; James P. McGee, 1241 Westport Rd., Burns Harbor, Porter County, IN (US) 46304

( * ) Notice: Subject to any disclaimer, the term of this patent is extended or adjusted under 35 U.S.C. 154(b) by 0 days.

(21) Appl. No.: 09/834,733

(22) Filed: Apr. 13, 2001

(65) Prior Publication Data

US 2001/0054628 A1 Dec. 27, 2001

Related U.S. Application Data

(60) Provisional application No. 60/196,610, filed on Apr. 13, 2000.

(51) Int. Cl.[7] .................. G01F 11/26

(52) U.S. Cl. .................. 222/456; 222/479; 141/59; 141/285; 141/309

(58) Field of Search .................. 222/479, 454, 222/456, 457; 141/285, 59, 290, 309, 481.5

(56) References Cited

U.S. PATENT DOCUMENTS

| | | | | | |
|---|---|---|---|---|---|
| 227,697 | A | * | 5/1880 | Massey | 141/309 |
| 932,026 | A | | 8/1909 | Keller | |
| 1,437,197 | A | | 11/1922 | Redifer et al. | |
| 1,454,803 | A | | 5/1923 | Wells | |
| 1,849,950 | A | | 3/1932 | Murdock | |
| 2,281,642 | A | * | 5/1942 | Ulanet | 215/79 |
| 2,847,042 | A | * | 8/1958 | Edelmann | 141/94 |
| 2,861,604 | A | * | 11/1958 | Whitmire | 141/285 |
| 2,871,895 | A | * | 2/1959 | Rektorys | 141/290 |
| 3,834,594 | A | | 9/1974 | Schiemann | 222/464 |
| 3,901,417 | A | | 8/1975 | Schiemann | 222/479 |
| 4,273,265 | A | | 6/1981 | Anderson | 222/189 |
| 4,588,111 | A | | 5/1986 | Hestehave | 222/479 |
| 5,538,165 | A | | 7/1996 | Frohn | 222/479 |
| 5,711,355 | A | | 1/1998 | Kowalczyk | 141/382 |
| 5,746,358 | A | | 5/1998 | Crosby | 222/479 |

* cited by examiner

*Primary Examiner*—Henry C. Yuen
*Assistant Examiner*—Melvin Cartagena
(74) *Attorney, Agent, or Firm*—Gary M. Hartman; Domenica N. S. Hartman

(57) ABSTRACT

A spout for a liquid container, such as a gasoline container, as well as a container equipped with the spout. The spout comprises a fluid passage and a vent passage fluidically parallel with the fluid passage. The fluid passage has an inlet, an outlet, and an S-shaped portion between the inlet and outlet. The vent passage has an inlet adjacent the outlet of the fluid passage. The S-shaped portion of the fluid passage is configured to entrap a liquid therein, causing a liquid lock to form, when a liquid is dispensed through the spout and air is prevented from flowing through the vent passage. In this manner, the spout is capable of preventing the overfilling of a receptacle tank being filled with fluid dispensed from a container equipped with the spout when the fluid level in the receptacle tank blocks the flow of air into the inlet of the vent passage.

15 Claims, 1 Drawing Sheet

OVERFILL SAFETY SPOUT FOR FLUID CONTAINER

CROSS REFERENCE TO RELATED APPLICATIONS

This application claims the benefit of U.S. Provisional Application No. 60/196,610, filed Apr. 13, 2000.

STATEMENT REGARDING FEDERALLY SPONSORED RESEARCH

Not applicable.

BACKGROUND OF THE INVENTION

The present invention generally relates to portable containers (e.g., a gas can) for liquids, such as gasoline, which are equipped with a spout to dispense a liquid into another container or reservoir, such as a gas tank. A container configured in accordance with the present invention is equipped with a spout or nozzle that prevents the overfilling of the receptacle tank.

BRIEF SUMMARY OF THE INVENTION

The invention provides a spout for a liquid container, such as a gasoline container, as well as a container equipped with the spout. The spout comprises a fluid passage and a vent passage fluidically parallel with the fluid passage. The fluid passage has an inlet, an outlet, and an S-shaped portion between the inlet and outlet. The vent passage has an inlet adjacent the outlet of the fluid passage. According to the invention, the S-shaped portion of the fluid passage is configured to entrap a liquid therein when a liquid is dispensed through the spout and air is prevented from flowing through the vent passage. More particularly, when dispensing a liquid from a container through the fluid passage, the S-shaped portion of the fluid passage entraps a portion of the liquid therein if air is prevented from entering or otherwise flowing through the vent passage. In this manner, the spout functions as an overfill safety spout that prevents the overfilling of a receptacle tank being filled with fluid dispensed from the container when the fluid level in the receptacle tank blocks the flow of air into the inlet of the vent passage.

Other objects and advantages of this invention will be better appreciated from the following detailed description.

DETAILED DESCRIPTION OF THE INVENTION

Figure 1:
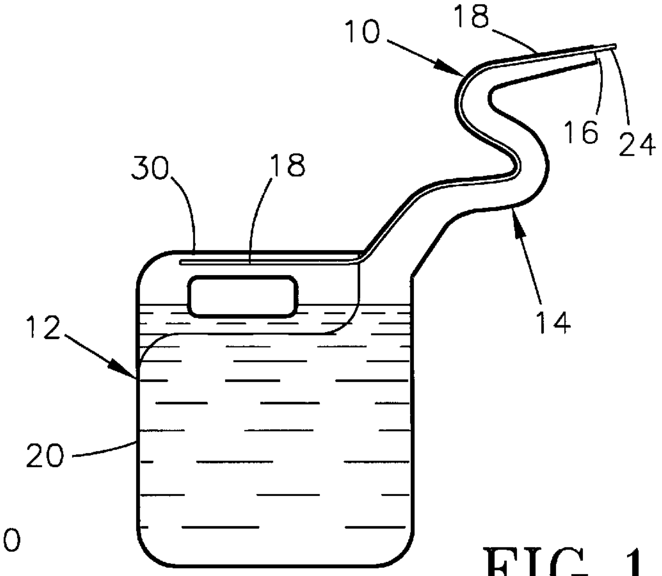
FIG. 1 shows a liquid container equipped with a safety spout in accordance with a first embodiment of this invention.
Figure 2:
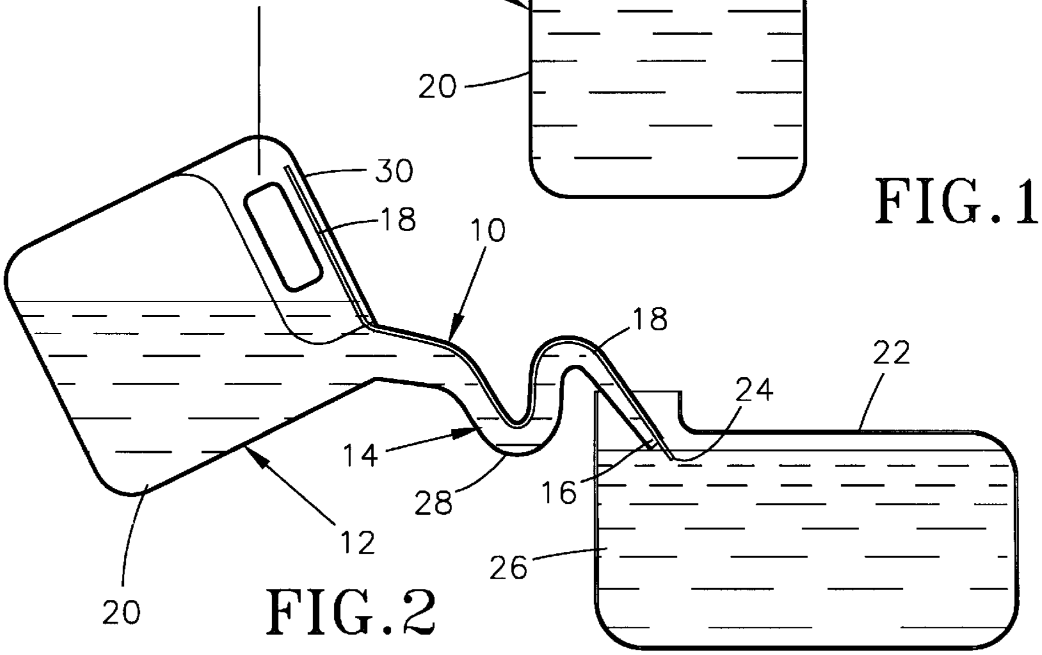
FIG. 2 represents the liquid container of FIG. 1 in use.

With reference to the Figures, the present invention provides a safety device incorporated into the spout 10 of the can 12. As depicted in FIGS. 1 and 2, the device comprises a gooseneck passage 14 within the spout 10, with a small air line 18 running from a point approximately one inch past the end 16 of the spout 10, through the gooseneck passage 14 and the length of the spout 10, to a point inside the can 12 above the highest elevation of the liquid 20 within the can

12 when the can 12 is tilted for pouring. These are the only two openings into the can 12: the spout 10 through which the liquid 20 is dispensed from the can 12, and the air line 18 running the length of the spout 10 which allows air to enter the can 12 to replace the dispensed liquid 20.

When the can 12 is tipped for filling another tank 22, the liquid 20 in the can 12 exits through the spout 10, and the dispensed liquid 20 is replaced by air entering the can 12 through the air line 18. When the liquid 26 in the tank 22 reaches the level of the inlet 24 to the air line 18 protruding from the spout 10, the flow of liquid 20 from the can 12 stops as it cannot be replaced by incoming air because the liquid 26 in the receptacle tank 22 has blocked the only means for air to enter the can 12. A small amount of additional liquid 20 may exit from the spout 10 below the gooseneck passage 14. As seen in FIG. 2, when that remaining liquid 20 has drained below the gooseneck passage 14, all flow from the can 12 is completely stopped. Fluid flow does not resume even when the air line 18 is removed from the liquid 26 in the receptacle tank, because a "fluid lock" 28 within the gooseneck passage 14 has formed, preventing air from entering the can 12 and preventing any liquid 20 from exiting the can 12 through the spout 10. Regardless of the fill level within the can 12, fluid flow through the spout 10 of the can 12 will remain stopped even after the spout 10 is removed from the tank 22, and even if the can 12 is held in an inverted position, thereby preventing overflow and spillage from the can 12. The fluid lock 28 remains effective until the can 12 is returned to an upright position and liquid trapped in the air line 18 and spout 10 is able to drain back into the can 12.

Significant advantages to a spout equipped with the safety device of this invention include eliminating the waste of liquid overfilling and overflowing the receptacle tank, eliminating potential environmental hazards associated with spillage of certain liquids, such as gasoline, and eliminating potential personal safety hazards associated with certain dangerous liquids.

FIGS. 1 and 2 merely represent one embodiment for a spout equipped with the safety device of this invention. A prototype of this embodiment was constructed using a commercially-available plastic fuel can with a detachable spout. The spout 10 with the gooseneck passage 14 was fabricated from a flexible gas line with a diameter of about ¾ inch, and the air line 18 was formed from a flexible copper water supply line with a diameter of about ⅛ inch. The air line 18 ran within the spout 10 and through the hollow handle 30 of the can 12. In use, after filling a second tank, liquid left in the spout 10 after filling the tank drained back into the can 12, and no residual liquid remained trapped in the spout 10 or air line 18 within the gooseneck passage 14.

Figure 3:
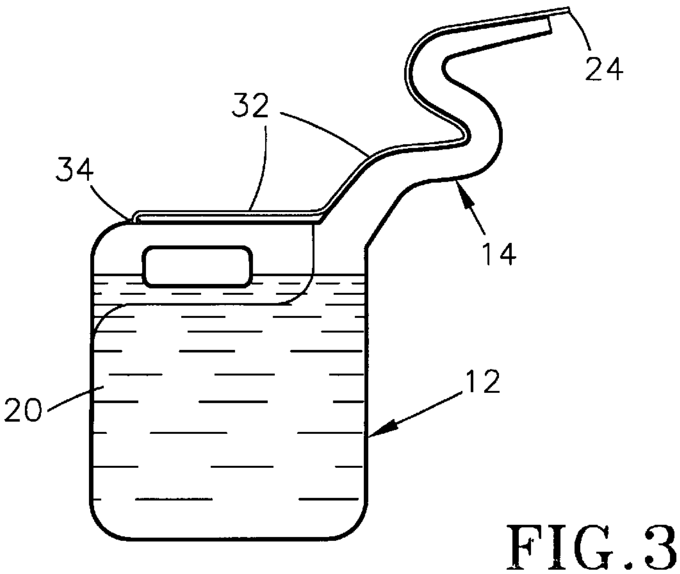
FIG. 3 shows a liquid container equipped with a safety spout in accordance with a second embodiment of this invention.

It is foreseeable that a spout incorporating the safety device of this invention could be constructed entirely of plastic or another suitable material. Further experiments with air lines and spouts of different diameters could be performed to optimize flow rates for various liquids and filling requirements. The gooseneck passage 14 could be incorporated entirely internally within the spout 10 (i.e., the gooseneck shape of the passage 14 is not apparent from the exterior of the spout 10). In addition, an air line 32 could be provided external to the spout 10 as shown in FIG. 3. The air line 32 connects to a vent port or air inlet 34 that many fuel cans are equipped with. This embodiment of the invention would function identically to that of FIGS. 1 and 2.

While the invention has been described in terms of two specific embodiments, it is apparent that other forms could be adopted by one skilled in the art. For example, the spout could be equipped with a self storing feature as incorporated on cans commercially available, the spout could differ in appearance and construction from the embodiments shown in the Figures, and appropriate materials could be substituted for those noted. Accordingly, it should be understood that the invention is not limited to the specific embodiments illustrated in the Figures. It should also be understood that the phraseology and terminology employed above are for the purpose of disclosing the illustrated embodiments, and do not necessarily serve as limitations to the scope of the invention. Accordingly, the scope of the invention is to be limited only by the following claims.

What is claimed is:

1. A spout for a liquid container, the spout comprising a liquid passage and a vent passage fluidically parallel with the liquid passage, the liquid passage having an inlet, an outlet and an S-shaped portion between the inlet and outlet, the vent passage having an inlet adjacent the outlet of the liquid passage and an S-shaped portion fluidically parallel with the S-shaped portion of the liquid passage, the S-shaped portion of the liquid passage being configured to cause a liquid lock to form therein when a liquid is dispensed through the spout and air is prevented from flowing through the vent passage.

2. A spout according to claim 1, wherein the inlet of the vent passage projects beyond the outlet of the liquid passage.

3. A spout according to claim 1, wherein the vent passage has an outlet beyond the inlet to the liquid passage.

4. A spout according to claim 1, further comprising the liquid container to which the spout is connected.

5. A spout according to claim 4, wherein the spout is an integrally-formed portion of the liquid container.

6. A spout according to claim 1, wherein the vent passage is defined by a conduit within the liquid passage.

7. A spout according to claim 6, further comprising the liquid container to which the spout is connected, the vent passage having an outlet disposed within the liquid container apart from the inlet to the liquid passage.

8. A spout according to claim 1, wherein the vent passage is defined by a conduit outside of the liquid passage.

9. A spout according to claim 8, further comprising the liquid container to which the spout is connected, the vent passage having an outlet attached to a vent port on the exterior of the liquid container.

10. A liquid container having a spout comprising a liquid passage and a vent passage fluidically parallel with the liquid passage, the liquid passage comprising an inlet at an interface between the spout and a wall of the container, an outlet and an S-shaped portion between the inlet and outlet, the vent passage having an inlet that projects beyond the outlet of the liquid passage and an S-shaped portion fluidically parallel with the S-shaped portion of the liquid passage, the S-shaped portion of the liquid passage being configured to entrap a liquid therein, causing a liquid lock to form therein, when the container is tipped to dispense the liquid from the container through the spout and air is prevented from entering the vent passage through the inlet thereof.

11. A liquid container according to claim 10, wherein the vent passage has an outlet disposed within the container apart from the inlet to the liquid passage.

12. A liquid container according to claim 10, wherein the spout is an integrally-formed portion of the container.

13. A liquid container according to claim 10, wherein the vent passage is defined by a conduit integrally formed within the liquid passage.

14. A liquid container according to claim 10, wherein the vent passage is defined by a conduit outside of the liquid passage.

15. A liquid container according to claim 14, wherein the vent passage has an outlet attached to a vent port on the exterior of the container.

* * * * *